Nov. 3, 1970  P. A. SHAFFER, JR  3,538,334
AUTOMATIC FOCUSING DEVICE WITH A PHOTOSENSITIVE
ERROR DETECTOR
Filed Jan. 24, 1968  2 Sheets-Sheet 1

Phillip A. Shaffer, Jr.,
INVENTOR.

BY

GOLOVE & KLEINBERG,
ATTORNEYS.

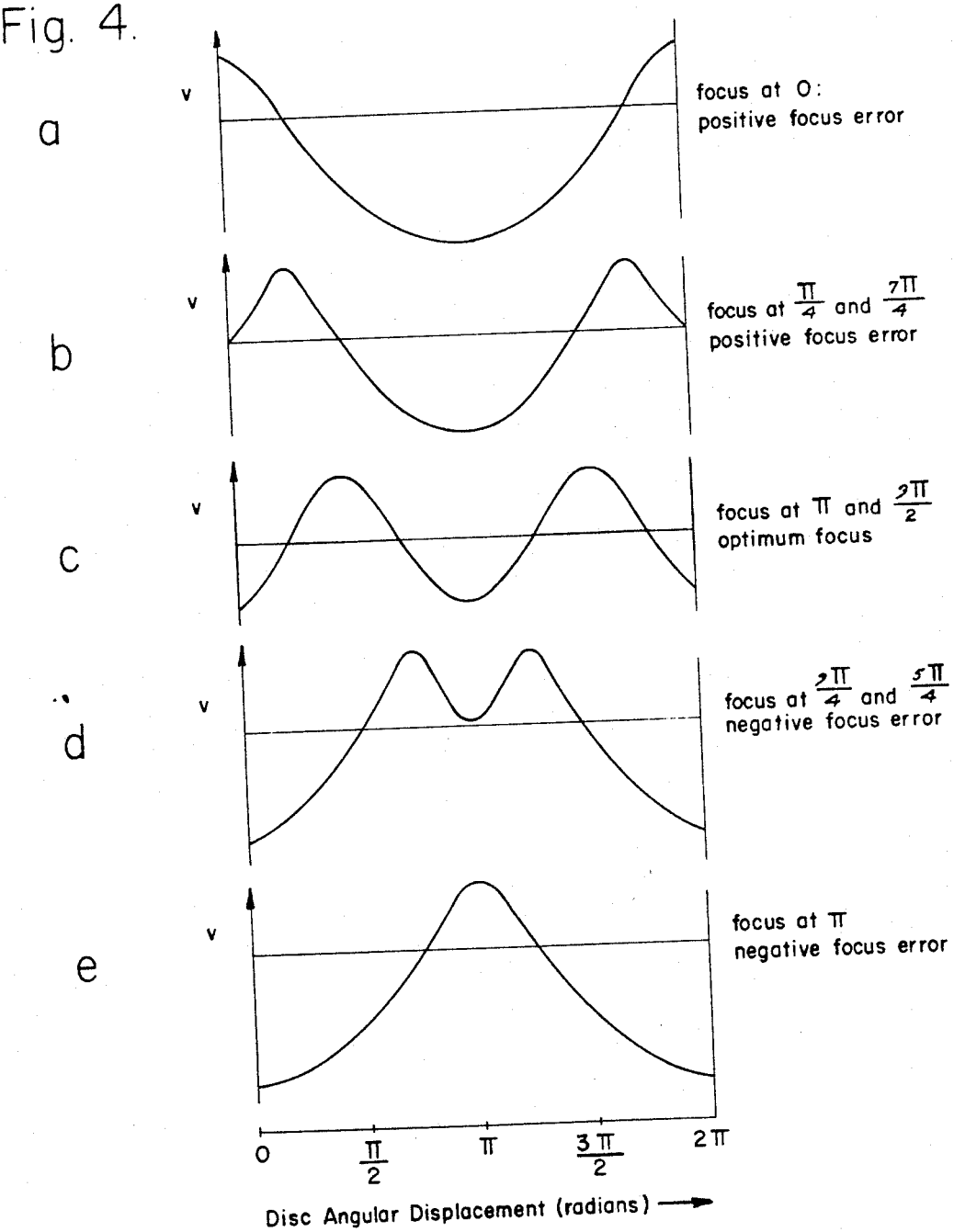

United States Patent Office 3,538,334
Patented Nov. 3, 1970

3,538,334
AUTOMATIC FOCUSING DEVICE WITH A PHOTOSENSITIVE ERROR DETECTOR
Philip A. Shaffer, Jr., Pasadena, Calif., assignor to Hycon Mfg. Company, Monrovia, Calif.
Filed Jan. 24, 1968, Ser. No. 700,302
Int. Cl. G01j 1/20; H01j 39/12
U.S. Cl. 250—201
14 Claims

ABSTRACT OF THE DISCLOSURE

An automatic focusing device for combination with an optical system. A stippled disk is positioned in the optical path of an image, and the position of the disk is cyclically varied about a predetermined position to generate a photometric signal having high frequency components exhibiting power proportional to the degree of image focus. The high frequency content of the signal, appropriately transduced, is evaluated for determining errors in image focus.

---

This invention relates to focus detecting systems, and more particularly to a device for automatically maintaining an optical image in optimum focus.

As a consequence of the inherent intelligence capabilities of aerial photography, sophisticated aerial cameras have been developed which in turn have become the dominant tools of surveillance and reconnaissance programs. The function of such a camera is to take high resolution photographs of terrain targets, while being carried by an aircraft. The degree of photographic resolution is significantly dependent upon the type of film utilized, the quality of the imaging lens system, and the capability of the camera system to maintain the image in optimum focus at the emulsion plane of the film during photographic exposure intervals.

Although high resolution lenses and films are available, and indeed are utilized in most aerial cameras, it has generally been experienced that the photographs produced are of significantly lesser resolution than lens-film capabilities. Such resolution degeneration is principally caused by defocusing of the lens that occurs during photographic exposures, whether caused by environmental effects or by uncompensated altitude changes of the aircraft. Obviously, a device which could automatically maintain the image in optimum focus could be responsible for a significant improvement in overall system resolution.

The present invention provides apparatus for automatically controlling the relative position of an optical lens and a predetermined image plane for maintaining image focus at that plane. When used with a camera for aerial surveillance, for example, a preferred embodiment of the invention continually monitors the aerial image produced at and near the emulsion plane of the film by the objective lens of the camera. An electrical signal is generated which has a magnitude and polarity corresponding to the degree and direction of focus degradation. This signal is used to control the distance between the objective lens of the camera and the film plane, automatically maintaining optimum focus of the image produced at the emulsion plane of the film.

Off axis rays from the camera lens are selected for examination so as not to interfere with the image produced on the film. This examination of the image enables correction for focus errors introduced by atmospheric effects upon the lens, which would be present in any system that determines target distance and sets focus for this distance. Furthermore, examination of the image is continuous while the camera is in operation.

The present invention is not limited to use with aerial cameras, but may be used for sensing focus at a predetermined plane of any camera or other optical system and for continuously optimizing image focus at that plane. Examples of such use would be the incorporation of the present invention in opthalmic instrumentation, in television and motion picture camera and projector systems, in star tracking apparatus, and in machine positioning and alignment apparatus.

The primary function of a lens is to focus the patterns of light and dark in a target onto an image plane without distortion. The target pattern may be considered to be a superposition of many sinusoidal light patterns of different spatial wave lengths, i.e., spatial frequency components of the incident light, and the transmission characteristics of a particular lens is determined by the degree of attenuation which it produces with respect to each of the incident spatial frequency components. A plot of the squared amplitudes of the spatial frequency components of the target light pattern against spatial frequency constitutes a spatial power spectrum for the target scene. The lens modifies his spectrum, and the transmitted power in the image spectrum varies with the degree of image focus, achieving a maximum when the image is in best focus.

Accordingly, a focus sensing device can find the image plane of best focus by monitoring the image power spectrum to determine when a maximum is achieved. The optical position of the image plane can be cyclically varied, producing corresponding variations in the focus of the image thereon, and the lens can be repositioned until the focus sensing devices indicates that the image power spectrum has been maximized (indicating optimum focus).

An automatic focusing device based upon these principles, is described in co-pending patent application of Chester L. Richards, S.N. 543,755, assigned to the assignee herein. Assuming that the power contribution in the image spectrum for virtually all spatial frequency components achieves a maximum when the image is in best focus, the Richards device isolates a single spatial frequency component from the entire power spectrum and monitors that component as an indicator of image focus. The single spatial frequency component is isolated from the entire image spectrum by means of a one dimensional spatial filter. For example, the image can be superimposed upon a transparency having a sinusoidal distribution of opacity along one spatial axis. As the spatial filter is moved along this axis, the isolated spatial frequency component is transformed to a photometric signal oscillating at a corresponding temporal frequency, and the effective optical position of the filter plane is cyclically varied so that the photometric signal has an amplitude proportional to the amplitude of the extracted spatial component. The photometric signal is transduced into an electrical signal which consists of a single frequency oscillation (or a narrow band of frequencies) having an amplitude proportional to the extracted frequency component of the image power spectrum, which varies in response to the cyclic focus shift. The electrical signal is thereupon processed to detect the position of the amplitude maxima in relation to a predetermined position representing the emulsion plane of the film, and an error signal is generated which can be utilized in a servosystem to reposition the lens into optimum focus.

In contrast to Richards, the present invention utilizes a two-dimensional spatial filter. In aerial photography, the target pattern is a random function of time, and each spatial component is therefore subject to random fluctuation. A two-dimensional spatial filter is one which produces a power spectrum which is likewise two-dimensional and, sgnificantly, very broad. While it is true that each distinct component fluctuates, the average power from the filter fluctuates in time less in the ratio of the spectral areas employed. The two-dimensional spatial filter, therefore, can contribute great advantage to a focus sensing device, in its relative independence of target scene fluctuations and drop-out.

Further, the power contribution in the image spectrum of the higher spatial frequency (or shorter spatial wavelength) components are more rapidly attenuated as a function of defocusing than that of the lower spatial frequency (or longer spatial wavelength) components. According to the present invention, the high spatial frequency content in the image power spectrum is evaluated and monitored as an indicator of image focus. The spatial image signal transmitted by the lens is transformed to a "noisy" temporal image signal at an image plane which can be positioned to receive an image which is identical in focus to the image appearing at the emulsion plane of the film. The effective optical position of the image plane is cyclically varied to produce an image thereon whose degree of focus varies with time, producing a corresponding periodic fluctuation in the transmission of the high frequency components in the image signal. This photometric signal is transduced into an electrical signal having corresponding frequency components and is amplified in such manner that the higher frequency components are accentuated. The resulting signal consists of broadband noise having a power proportional to the high frequency content of the image power spectrum, which varies in response to the cyclic focus shift. The electrical signal is thereupon processed to detect the position representing the emulsion plane of the film, and an error signal is generated which can be utilized in a servosystem to reposition the lens into optimum focus.

In a preferred embodiment of apparatus according to the present invention, a rotating transparent disc having a random distribution of opacity along two spatial dimensions upon the face of the disk, (for example, a stipple pattern) is utilized for transforming the spatial image signal into a noisy temporal image signal. The power spectrum associated with the rotating, randomly stippled disc is essentially uniform to relatively high frequencies and is very broad, commonly referred to as representing "white noise." When the stipple power spectrum is convolved with the image power spectrum, the resulting photometric signal contains components oscillating at temporal frequencies proportional to the spatial frequency components of the image power spectrum at the plane of the disc.

Cyclic focus shifting is accomplished by mounting the disc to a motor drive shaft such that one axis in the plane of the stipple pattern is orthogonal to the drive shaft (which is parallel to the optical axis of the focus sensor), while a second axis in the plane of the stipple pattern and orthogonal to the first axis is positioned such that it is slightly inclined from a perpendicular to the optical axis. When the disc is driven to rotate about an axis parallel to the optical axis, the plane of the stipple pattern will oscillate through an arc, completing one period for each disc rotation. The disc is positioned so that the middle of the arc describes an image plane on the stipple pattern which has an effective optical path length from the lens which is exactly equal to the effective optical path length between the lens and the emulsion plane of the film, when the lens is in optimum focus.

When this stipple disc is rotated and the light flux transmitted therethrough is collected by a photodetector, the resulting electrical signal consists of a broadband noise "filler" within a periodic envelope. This signal is amplified to emphasize the high frequency components. For example, a differentiating amplifier can be utilized so that gain is proportional to frequency, resulting in exaggerating gain to the high frequency signal components which are due to increased high frequency content in the image power spectrum. The photodetector output signal power spectrum will be richest in high frequency components when the plane of the rotating stipple pattern exactly corresponds to the plane of best focus, so that the maxima of the modulation envelope will occur at these times. The differentiating amplifier output signal is further processed through a square law detector and averaging filter, and the output signal of the averaging filter is a voltage which is proportional to the detected power as a function of time, with the maxima of the output voltage signal corresponding in time to the maxima of the modulation envelope.

An error signal is generated for indicating the deviation of actual image focus from optimum focus, and phase comparison techniques may be utilized for this purpose. For example, a reference voltage signal which varies according to angular displacement in the rotation of the stipple disc can be generated, such as by means of a two pole alternator turning at the disc shaft speed. The generated reference signal is proportional to the cosine of the shaft rotational angle. Phase comparator means can be utilized to produce an output signal which is responsive to the relative phases of the reference signal and of the filter output signal. When the image is in optimum focus, the filter output signal is comprised of even harmonics. First harmonic content in the signal is proportional to the degree of image focus degeneration, and the amplitude of the first harmonic component is zero at optimum focus. The direction of the phase difference (hence the direction of the focus error) appears as a polarity in the error signal.

The error signal is thereupon applied to a servo motor which drives the lens for maintaining the image in optimum focus.

Accordingly, it is an object of the present invention to provide an image focus sensing device which can be utilized for automatically maintaining an optical image in optimum focus.

It is another object of the present invention to provide an automatic focusing device for utilization with an aerial camera.

It is a further object of the present invention to provide means for analyzing the image power spectrum transmitted by a lens system for detecting the plane at which the lens must be located in order to provide an image which is in optimum focus at a predetermined image plane.

It is yet another object of the present invention to provide apparatus for locating the plane of best focus of the lens or other imaging device with respect to an arbitrary predetermined plane, and which generates an error signal proportional to the distance between the two planes for purposes of focus correction.

It is a still further object of the present invention to provide apparatus for evaluating and monitoring the high spatial frequency content in an image power spectrum, for utilization as an indicator of image focus.

The novel features which are believed to be characteristic of the invention, together with further advantages thereof, will be better understood from the following description considered in connection with the accompanying drawings in which a preferred embodiment of the invention is illustrated by way of example. It is to be expressly understood, however, that the drawings are for the purpose of illustration and description only, and are not intended as a definition of the limits of the invention.

FIG. 4 is a series of diagrams illustrating forms of the filter output signal for various focus conditions.

Figure 1:
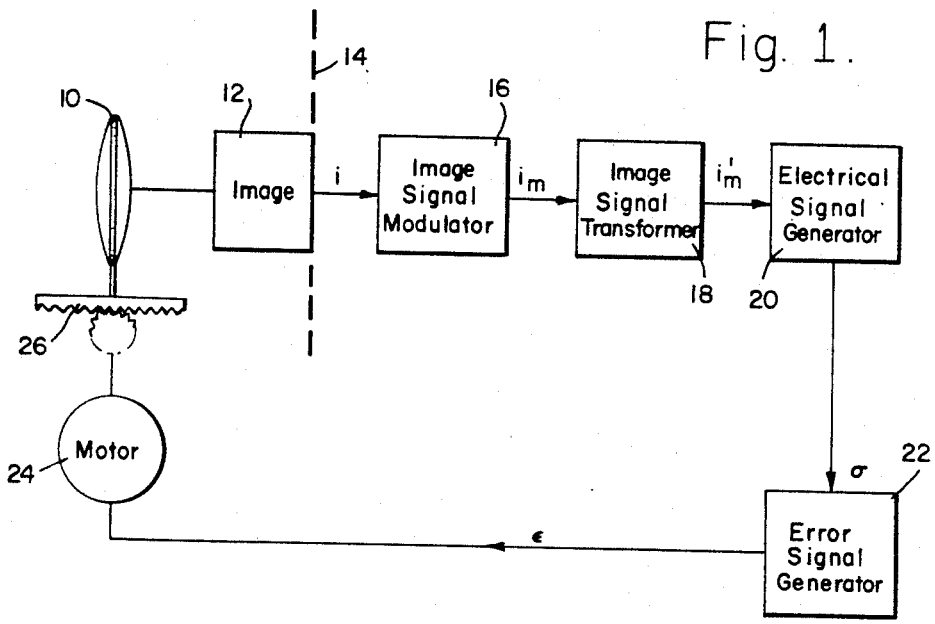
FIG. 1 is a block diagram of automatic focusing apparatus according to the present invention, in combination with a camera.

With reference to the drawings, there is shown in FIG. 1 a block diagram which sets forth the functions and interrelations of the various elements of the present invention when used in conjunction with a camera. A camera lens 10 projects an image 12 at or near a predetermined plane 14 which coincides with the emulsion plane of the film within the camera.

A spatial image signal $i$ representing the image, is amplitude modulated by an image signal modulator 16. The impressed modulation is dependent upon time varying changes in the distance between the camera lens 10 and the predetermined image plane 14, so that the modulated image signal $i_m$ includes high frequency components having amplitudes which vary with image focus.

The modulated spatial image signal $i_m$ is transformed by an image signal transformer 18, to a correspondingly modulated temporal image signal $i_m'$. This latter image signal is a photometric quantity containing high frequency components having amplitudes representing light intensities, fluctuating in accordance with the degree of image focus. The power exhibited by the photometric signal $i_m'$ is therefore proportional to the amplitudes of the high frequency components, and the photometric signal $i_m'$ is applied to an electrical signal generator 20 which generates a corresponding electrical signal $\sigma$ having increased amplitude modulation proportional to high frequency content in the applied photometric signal.

The electrical signal $\sigma$ is applied to an error signal generator 22, which generates an error signal $\epsilon$ which is representative of the error in image focus. The magnitude and polarity of the error signal $\epsilon$ may be observed by appropriate read-out means (not shown) for detecting the magnitude and direction of the focus error, or it may be utilized to actuate a servosystem for automatic focusing. For example, the error signal $\epsilon$ can be applied to a servo motor 24 which drives a mechanical positioning device 26 for repositioning the camera lens 10 so that its image 12 is maintained at optimum focus at the predetermined image plane 14.

Figure 2:
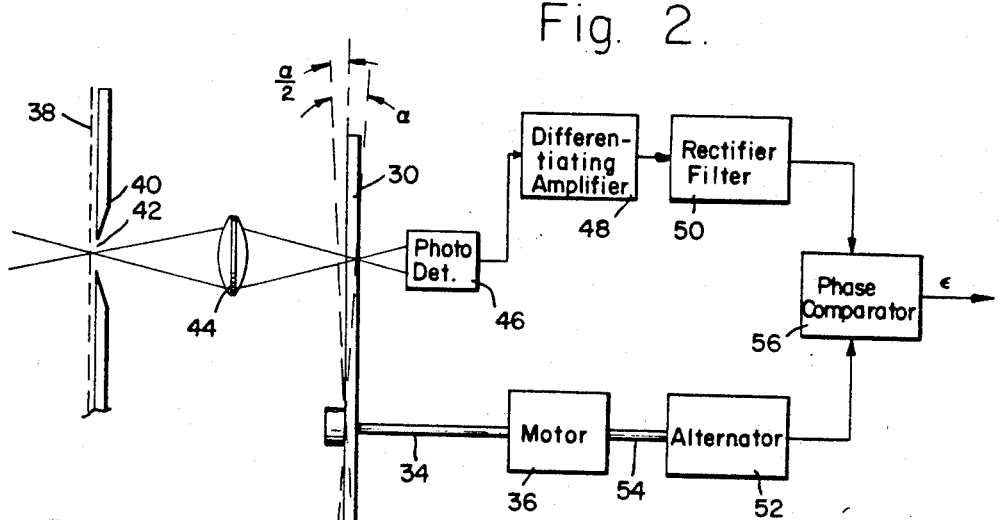
FIG. 2 is a part side section, part block diagram of a preferred embodiment of focus sensing apparatus according to the present invention.
Figure 3:
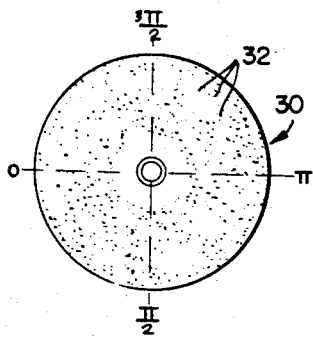
FIG. 3 is a front view of a stipple disc configuration utilized in the preferred embodiment of FIG. 2.

Turning to FIG. 2, there is shown a preferred embodiment of apparatus according to the present invention in which a rotating disc member 30 is utilized for both image signal modulation and transformation. An example of such a disc 30 is shown in FIG. 3, which is a transparent disc having a plurality of randomly positioned opaque dots applied to one surface, or stippled thereon. The stipple disc 30 may be considered to have two mutually orthogonal axes in the stipple plane, such as a $(0-\pi)$ axis and a $$\left(\frac{\pi}{2} - \frac{3\pi}{2}\right)$$

axis.

Returning to FIG. 2, the stippled disc 30 is centrally mounted to a motor drive shaft 34 such that one axis in the plane of the stipple pattern is perpendicular to the drive shaft 34 while the second axis is slightly inclined from a perpendicular to the drive shaft. If the $$\left(\frac{\pi}{2} - \frac{3\pi}{2}\right)$$

axis is perpendicular to the drive shaft 34, and the $(0-\pi)$ axis is not perpendicular to the drive shaft 34, the stipple disc 30 can be positioned so that the "0" point on the periphery of the disc 30 is closest to the camera lens (not shown, but located to the left of the apparatus shown in FIG. 2), the "$\pi$ point" located farthest from the camera lens, and all points on the $$\left(\frac{\pi}{2} - \frac{3\pi}{2}\right)$$

axis equidistant from the camera lens position.

When the motor drive shaft 34 is driven by a motor 36, the stipple disc 30 is correspondingly rotated but oscillates through an arc $\alpha$, one complete oscillation occurring for each disc rotation from 0 to $2\pi$.

It should be pointed out that many optical systems which produce an image at a predetermined plane will not normally permit the locating of the stipple disc 30 in that plane. Most cameras are included in this class of optical systems, and when used in combination with a camera, the focus sensor usually must include means to transfer the image which is located at the predetermined plane to a more convenient image plane. For example, in a camera the predetermined image plane coincides with the emulsion plane 38 of the film which is positioned on the camera platen 40. A portion of the camera image occurring at the film emulsion plane 38 can be monitored by providing an aperture 42 in the platen 40 outside the film format of the camera. The monitored portion of the camera image is transferred to a more convenient "transfer image plane," by means of a transfer lens 44. The $$\left(\frac{\pi}{2} - \frac{3\pi}{2}\right)$$

axis of the stipple disc 30 is always superimposed upon this transfer image plane, so that when the camera image is in optimum focus at the predetermined plane 38, the monitored portion of the camera image will also be in optimum focus at the stripple disc 30 when in an arc position of $\alpha/2$.

A photoelectric transducer, such as a photodetector 46, is positioned to receive the light flux transmitted through the rotating stipple disc 30, and to generate therefrom an electrical signal consisting of broadband noise filler within a modulation envelope. The photoedetector output signal is amplified by a differentiating amplifier 48 so that gain is proportional to frequency. The amplifier output signal exhibits amplitudes which vary in accordance with the high frequency content in the image power spectrum, corresponding to the cyclic shift in image focus caused by the oscillations of the stipple disc 30.

The amplifier output signal is applied to a square law detector and averaging filter 50, and the filter output signal is proportional to the modulation envelope, having maxima during times when the plane of the rotating stipple pattern of the disc 30 exactly corresponds to the plane of best focus.

The wave forms shown in FIG. 4 are illustrative of the filter output voltage at various conditions of image focus, for one complete disc revolution. When the camera image is at optimum focus at the predetermined plane, the image at the transfer image plane is also at best focus so that the filter output voltage will be maximized when the $$\left(\frac{\pi}{2} - \frac{3\pi}{2}\right)$$

axis intersects the transferred image. This condition corresponds to disc angular displacements of $\pi/2$ and $3\pi/2$ radians, shown in FIG. 4c. The filter output voltage exhibits minima at disc angular displacements of 0 and $\pi$ radians, corresponding to interceptions of the transferred image with the disc at worst focus when the camera image is at optimum focus at the film emulsion plane of the camera. The wave form shown in FIG. 4c displays minimum fundamental frequency content and maximum second harmonic frequency content.

As the error in focus at the predetermined camera plane increases, the magnitude of the fundamental component of the filter output voltage increases from zero, the phase being positive for positive focus error and negative for negative focus error. These conditions are shown by the remaining wave forms in FIG. 4, in which FIG 4a illustrates a positive focus error, where the disc angular displacement corresponding to best focus of the image at the disc is at 0 radian, while another positive focus error (focus at $\pi/4$ and $7\pi/4$ radians) is shown in FIG. 4b. Two conditions of negative focus error (focus at $3\pi/4$ and $5\pi/4$ radians, and focus at $\pi$ radians) are shown in FIGS. 4d and e, respectively.

Since the phases of the filter output voltage vary according to the condition of image focus error at the film emulsion plane, the phase of the filter output voltage can be compared to the phase of a reference signal for generating an error signal representative of focus error. Returning again to FIG. 2, a reference signal is generated which varies according to the angular displacement of the disc 30, such as by means of a two pole alternator 52 driven by the disc motor 36 through a second motor shaft 54 turning at the same speed as the first motor shaft 34. The generated reference signal is proportional to the cosine of the shaft angular displacement.

The reference signal and the filter output signal are applied as inputs to a phase comparator 56, which generates an error signal $\epsilon$ which is responsive to the relative phases of the two input signals. When the crossover points of the reference signal and the filter output signal occur simultaneously, the generated error signal $\epsilon$ will be 0, indicating optimum focus of the image at the predetermined image plane 38. At other conditions of focus at the predetermined image plane 38, the error signal $\epsilon$ will be a D.C. voltage having a magnitude and polarity corresponding to the distance and direction, respectively, by which the image at the predetermined plane 38 is out of focus.

The focus sensor apparatus of FIG. 2 can be utilized in a servosystem for automatically repositioning the camera lens (not shown) to maintain an image in optimum focus at the predetermined image plane 38. The error signal $\epsilon$ can be applied to a servo motor through a servo-amplifier (not shown), to drive a mechanical device for repositioning the camera lens as indicated in FIG. 1.

Thus there has been shown a preferred embodiment of apparatus which monitors an image at a predetermined image plane, for automatically maintaining the image in optimum focus.

Other embodiments of the present invention and modifications of the embodiment herein presented may be developed without departing from the essential characteristics thereof. For example, means for modulating the image signal may be provided by the various focus shifting configurations disclosed in the Richards patent application, hereinbefore referenced. Accordingly, the invention should be limited only by the scope of the claims appended below.

What is claimed as new is:

1. In combination with an optical system for producing an image at a predetermined image plane, apparatus for producing signals related to the focus of the image at the predetermined image plane, comprising the combination of:
    (a) first means adapted to intercept an optical signal representing the image at the predetermined plan, for modulating said optical signal in a continuous function proportional to image focus;
    (b) second means including an integrating photo detector adapted to intercept the modulated optical signal, for transforming said modulated optical signal to a photometric signal including high frequency components having amplitudes proportional to the degree of image focus, and
    (c) third means coupled to said second means to receive said photometric signal, for generating an output signal proportional to power exhibited by said high frequency components.

2. Apparatus according to claim 1, above, further including fourth means connected to said first and third means for generating an error signal representing the deviation from optimum focus of the image at the predetermined image plane, said error signal having magnitude and sense corresponding to variation in said output signal with respect to a reference signal representing impressed modulation, said fourth means including means for generating said reference signal.

3. Apparatus according to claim 1, above, further including imaging means interposed between the predetermined plane and said first means, for producing said optical signal.

4. Apparatus according to claim 2, above, further including servo means adapted to be connected to the optical system and to said fourth means and operable in response to said error signal, for changing the actual focus of the optical system image to maintain said error signal at a minimum magnitude.

5. Apparatus for detecting and signalling the deviation from optimum focus of an optical system image at a first image plane, comprising the combination of:
    (a) imaging means adapted to receive the optical system image for producing a second image having focus at a second image plane substantially identical to the focus of said optical system image;
    (b) defocusing means for cyclically varying the focus of said second image and for generating a reference signal representing variation in focus of said second image with respect to actual focus of said first image;
    (c) spatial filter means interposed in the optical path in the vicinity of said second image plane, said spatial filter means including an interposed element of opacity randomly varying in a preselected pattern along two spatial dimensions;
    (d) sensing means optically coupled to said spatial filter means for generating an output signal representing variation in focus of said second image with respect to optimum focus of said first image; and
    (e) error generating means adapted to receive said reference and output signals for generating therefrom an error signal having magnitude and sense corresponding to the deviation from optimum to actual focus of said optical system image.

6. Apparatus according to claim 5, above, further including servo means adapted to be connected to the optical system and to receive said error signal, for changing the actual focus of said optical system image to maintain said error signal at a minimum magnitude.

7. Apparatus according to claim 5, above, wherein said preselected pattern of opacity is a stipple of preselected density.

8. Apparatus according to claim 5, above, wherein said spatial filter means interposed element is a portion of a transparent disc, said preselected pattern of opacity arranged to randomly vary radially and angularly about the face of said disc, and said spatial filter means further includes means for rotating said disc about an axis central thereto.

9. Apparatus according to claim 8, above, wherein said defocusing means includes means for causing said interposed element to oscillate through said second image plane when said disc is rotated.

10. Apparatus according to claim 8, above, wherein said defocusing means includes means for inclining said disc with respect to said axis.

11. Apparatus for sensing image focus, spatial filter means comprising:
    (a) transparent means adapted to intercept an image, said transparent means having a preselected pattern of opacity randomly varying along two spatial dimensions thereon;
    (b) means for moving said transparent means along one of said dimensions.

12. The spatial filter means according to claim 11, above, wherein said preselected pattern of opacity is a stipple of preselected density.

13. In image focus sensing apparatus, oscillating spatial filter means comprising:
    (a) a transparent disc having a preselected pattern of opacity randomly varying along two dimensions upon the face of said disc;
    (b) means for rotating said disc about an axis central thereto; and (c) means for inclining said disc with respect to said axis.

14. Apparatus according to claim 13, above, wherein said preselected pattern of opacity is a stipple of preselected density.

References Cited
UNITED STATES PATENTS

| | | | |
|---|---|---|---|
| 2,831,057 | 4/1958 | Orthuber | 250—201 X |
| 2,838,600 | 6/1958 | Salinger | 250—201 X |
| 3,041,459 | 6/1962 | Greene | 250—201 X |
| 3,372,282 | 3/1968 | Bressler | 250—236 |
| 3,418,477 | 12/1968 | Knutrud et al. | 250—201 X |

JAMES W. LAWRENCE, Primary Examiner

C. R. CAMPBELL, Asistant Examiner

U.S. Cl. X.R.

250—236, 237; 356—123, 127